Patented Aug. 31, 1937

2,091,935

UNITED STATES PATENT OFFICE 2,091,935

INSECTICIDES AND FUNGICIDES

Theron P. Remy, Los Angeles, Calif., and Waldersee B. Hendrey, Beacon, N. Y., assignors to The Texas Company, New York, N. Y., a corporation of Delaware No Drawing. Application August 2, 1934, Serial No. 738,044

7 Claims. (Cl. 167—43)

This invention relates to insecticides and fungicides and more particularly to insecticides and fungicides of the type comprising mixtures of mineral oil and water.

The invention contemplates the manufacture of insecticidal and fungicidal emulsions maintained at a pH value of between 8 and 9, which emulsions are composed essentially of water, a mineral oil, a finely-divided solid dispersing agent, a gum for stabilizing the emulsion, a chemical for protecting the gum against deterioration and a chemical compound for maintaining the emulsion at the proper pH value.

Insecticides in the form of emulsions are widely known and used at the present time. A large number of these emulsions are stabilized with soaps in order to bring about the proper dispersion of the oil and to lend stability to the emulsion. There is reason to believe that the presence of the soaps is not entirely desirable since they may cause the burning of leaves and fruits when insecticides containing the same are applied to plant growth. There are also in use emulsions which readily break when applied to plant growth, that is, a rapid separation of the oil from the water occurs. The use of emulsions such as these is not entirely satisfactory since, upon the breaking of the emulsion, the oil forms relatively large globules which, although having a high insecticidal action, are usually too unevenly distributed to insure a satisfactory kill of the insect infesting the plant growth.

These so-called quick-breaking emulsions also sacrifice some of their normal stability, so that in storage the emulsions may break down and release the emulsified oil from the composition. This is an exceedingly undesirable condition since the consumer is forced to take steps to re-emulsify the oil which has separated.

We have discovered an insecticidal and fungicidal oil emulsion which has an exceedingly high stability during storage but does not contain any undesirable soap stabilizing agents. Furthermore, when this emulsion is diluted with the proper amount of water and applied to plant growth, it does not break down to form the large globules of oil which characterize the quick-breaking emulsions but instead permits of the thorough filming of the plant growth with the oil. Thus, an even distribution of the oil and a high kill of the insect and fungus life is insured. We have also discovered that the finely-divided adsorbents or colloidal clays which we employ in the preparation of the emulsions forming the basis of our invention inhibit or retard the harmful effects caused by employing oils containing unsaturated hydrocarbons. Therefore, we are enabled to employ the less rigorously refined oils without any danger of harming plant growth. Although we are unable to give an explanation for the action of the finely-divided adsorbents and colloidal clays, it is thought that the phenomenon is due in part at least to the preferential adsorption of the unsaturated bodies on the adsorbents or clays.

In the course of our experimental work, it was found that petroleum hydrocarbon oils and water, when emulsified with finely-divided adsorbents or colloidal clays such as fuller's earth, kaolin and the like, yielded insecticidal emulsions. Although these emulsions were quite effective insofar as their insecticidal quality was concerned, nevertheless they were relatively unstable during storage and also broke too quickly when applied to plants. It was discovered that by employing gum arabic or similar gum stabilizing agents such as gum tragacanth, an emulsion having a high insecticidal efficiency could be produced which was also characterized by displaying a high stability during storage and transportation. In order to prevent organic decomposition of the gum stabilizing agents, it is desirable to incorporate in the emulsion small amounts of antiseptic compounds such as sodium benzoate, sodium disulfite, formaldehyde, and similar materials which effectively prevent any deterioration of the gums.

The insecticidal and fungicidal emulsions with which the present application is concerned must be maintained at a pH value between 8 and 9. It has been found experimentally that at this hydrogen ion concentration, the emulsions display their greatest stability during storage and yield the most satisfactory results when applied to plant growth. This is most readily effected by incorporating in the emulsion a small proportion of a compound having an alkaline reaction and which is characterized by yielding the proper pH value when added to the emulsion in small quantities. Although sodium carbonate has been found to be a highly satisfactory material, other compounds such as trisodium phosphate, sodium metasilicate or the like, yielding the same hydrogen ion concentration, when incorporated in the emulsion, may be employed.

In order to more clearly illustrate the invention, we give herewith a typical formula of an emulsion prepared in accordance therewith:

| | Per cent |
|---|---|
| Mineral oil | 67 |
| Fuller's earth | 6.3 |
| Gum arabic | 1 |
| Formaldehyde | 0.12 |
| Soda ash | 0.09 |
| Balance | Water |

The emulsion is prepared in the following manner: The water, gum arabic, formaldehyde, and sodium carbonate are thoroughly mixed in order to insure complete solution. The oil is then gradually added until it is well incorporated in the aqueous phase. Thereupon, the fuller's earth is added and the mixture thoroughly agitated in order to insure even dispersion. At this stage, the mixture has the consistency of a heavy mayonnaise. The emulsion is then passed through a colloid mill which brings about an extremely fine division of the oil throughout the mass. In the course of this operation, the temperature rises to a value which may be in the neighborhood of 120° F. The product obtained is a heavy viscous emulsion which, upon dilution with the proper amount of water, yields a highly satisfactory insecticidal and fungicidal emulsion. For application to plant structures, the concentrated emulsion may be diluted with from 20 to 100 parts of water.

It may be found desirable to color the emulsion. This is most readily done by incorporating in the mixture, during the process of agitation, a small percentage of a dyestuff which may be either water or oil soluble.

In the preparation of the concentrated emulsions, varying quantities of the different ingredients may be employed. For example, the oil may constitute as much as 85% of the emulsion while the content of fuller's earth or colloidal clay may vary from about 1 to 9% of the total weight of the thick emulsion. The quantity of the finely-divided solid used may vary somewhat with its individual characteristics and will also depend somewhat upon the physical properties of the oil used both as to specific gravity and viscosity. In the example hereinbefore set forth, an oil having a viscosity of approximately 100 seconds Saybolt Universal at 100° F. was employed. However, oils having higher or lower viscosities may be found satisfactory. For example, viscosities of the oils may range from approximately 70 seconds Saybolt Universal at 100° F. to 200 seconds Saybolt Universal at 100° F.

All types of mineral oils may be employed in the preparation of the emulsions which form the basis of this invention and no limitations are to be placed on these oils other than the limitation of viscosity previously discussed. It may be desirable to replace part of the mineral oil with sulfurized petroleum hydrocarbon oils prepared by heating a mixture of petroleum hydrocarbon oil and sulfur to an elevated temperature to bring about the formation of compounds containing chemically combined sulfur. These sulfurized oils may also be prepared by reacting petroleum hydrocarbon oils with sulfur in the presence of fatty acids or terpene hydrocarbons such as pine oil. It has been found that extremely satisfactory results may be obtained with an emulsion prepared in accordance with this invention to which there has been added a quantity of such sulfurized oil. It is to be understood that the term mineral oils as used in the claims includes the above described sulfurized mineral oils or sulfurized hydrocarbon oils.

Obviously many modifications and variations of the invention as hereinbefore set forth, may be made without departing from the spirit and scope thereof, and therefore only such limitations should be imposed as are indicated in the appended claims.

We claim:

1. An insecticidal and fungicidal emulsion comprising a mineral oil, a finely-divided solid dispersing agent, water, a gum emulsion-stabilizing agent, a preservative for the gum, and an alkaline chemical in an amount sufficient for maintaining the emulsion at a pH value of from 8 to 9.

2. An insecticidal and fungicidal emulsion which comprises a mineral oil, finely-divided colloidal clay, water, a gum emulsion-stabilizing agent, a preservative for the gum, and an alkaline material in an amount such as to maintain the emulsion at a pH value of from 8 to 9.

3. An insecticidal and fungicidal emulsion which comprises a petroleum hydrocarbon oil, finely-divided colloidal clay, water, gum arabic, formaldehyde, and sodium carbonate in an amount sufficient to maintain the emulsion at a pH value of from 8 to 9.

4. An insecticidal and fungicidal emulsion which comprises a petroleum lubricating oil having a viscosity of from 70 to 200 seconds Saybolt Universal at 100° F., finely-divided fuller's earth, water, gum arabic, formaldehyde, and sodium carbonate in an amount sufficient to maintain the emulsion at a pH value of from 8 to 9.

5. An insecticidal and fungicidal emulsion which comprises a petroleum hydrocarbon lubricating oil having a viscosity of over 70 seconds Saybolt Universal at 100° F., water, finely-divided fuller's earth, gum arabic, formaldehyde, and sodium carbonate in an amount sufficient to maintain the emulsion at a pH value of from 8 to 9.

6. An insecticidal and fungicidal emulsion consisting of 67% of mineral oil, 6.3% of fuller's earth, 1% of gum arabic, 0.12% of formaldehyde, 0.09% of sodium carbonate, and the balance water.

7. An insecticide and fungicide comprising mineral oil, sulfurized mineral oil, a finely-divided solid dispersing agent, water, a gum emulsion-stabilizing agent, a gum preservative, and an alkaline material in an amount such as to maintain the emulsion at a pH of from 8 to 9.

THERON P. REMY.
WALDERSEE B. HENDREY.